(12) United States Patent
Sutton et al.

(10) Patent No.: US 8,367,027 B2
(45) Date of Patent: Feb. 5, 2013

(54) REGENERATION OF AMMONIA BORANE FROM POLYBORAZYLENE

(75) Inventors: Andrew Sutton, Los Alamos, NM (US); John C. Gordon, Los Alamos, NM (US); Kevin C. Ott, Santa Fe, NM (US); Anthony K Burrell, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 446 days.

(21) Appl. No.: 12/762,895

(22) Filed: Apr. 19, 2010

(65) Prior Publication Data

US 2010/0272622 A1    Oct. 28, 2010

Related U.S. Application Data

(60) Provisional application No. 61/170,777, filed on Apr. 20, 2009, provisional application No. 61/180,158, filed on May 21, 2009, provisional application No. 61/240,109, filed on Sep. 4, 2009.

(51) Int. Cl.
*C01B 35/14* (2006.01)

(52) U.S. Cl. .................................................. 423/285

(58) Field of Classification Search .................. None
See application file for complete search history.

(56) References Cited

U.S. PATENT DOCUMENTS

| 4,381,206 A | * | 4/1983 | Grant et al. ................. 149/22 |
| RE39,744 E | | 7/2007 | Ishii |
| 2007/0243122 A1 | | 10/2007 | Ramachandran |
| 2008/0193356 A1 | * | 8/2008 | Wolf et al. ................. 423/287 |
| 2009/0191110 A1 | * | 7/2009 | Davis et al. ................. 423/285 |

OTHER PUBLICATIONS

Ahluwalia, et al, "System Level Analysis of Hydrogen Storage Options", FY 2008 Annual Progress Report, Oct. 2008, pp. 731-735.
Mohajeri, et al., "Regeneration of Ammonia-Borane Complex for Hydrogen Storage", Mater. Res. Soc. Symp. Proc., 2005, vol. 884E, pp. GG1.4.1.-GG1.4.7.
P. Ramachandran et al., "Preparation of Ammonia Borane in High Yield and Purity, Methanolysis, and Regeneration", Inorg. Chem. 2007, vol. 46, No. 19, pp. 7810-7817.

* cited by examiner

*Primary Examiner* — Emily Le
*Assistant Examiner* — Michael Forrest
(74) *Attorney, Agent, or Firm* — Julia A. Jones

(57) ABSTRACT

Method of producing ammonia borane, comprising providing a reagent comprising a dehydrogenated material in a suitable solvent; and combining the reagent with a reducing agent comprising hydrazine, a hydrazine derivative, or combinations thereof, in a reaction which produces a mixture comprising ammonia borane.

20 Claims, 1 Drawing Sheet

REGENERATION OF AMMONIA BORANE FROM POLYBORAZYLENE

CROSS REFERENCE TO RELATED APPLICATION

This application claims the benefit of priority of U.S. Provisional Patent Applications 61/170,777, filed Apr. 20, 2009; 61/180,158, filed May 21, 2009; and 61/240,109, filed Sep. 4, 2009; all incorporated herein in their entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to regeneration of hydrogen storage materials used in fuel cells, specifically, to a single-step method of regeneration of ammonia borane from dehydrogenated materials, for example polyborazylene, cyclopentaborazane, or spent fuel products.

BACKGROUND OF THE INVENTION

A necessary target in realizing alternative energy sources, in particular in the transportation sector, is hydrogen storage for controlled delivery to an energy-producing fuel cell. Chemical hydrogen storage has been dominated by ammonia borane ($H_3B$—$NH_3$, or "AB"), which is a desirable material due to its high gravimetric capacity of hydrogen (19.6 wt %) and low molecular weight (30.7 g mol$^{-1}$). In contrast to the loss of $H_2$ from $C_2H_6$, which is substantially endothermic, AB has both hydridic and protic moieties, yielding a material from which $H_2$ can be readily released. As such, a number of publications have described $H_2$ release from amine boranes, yielding various rates depending on the method applied.

Spent hydrogen fuel composition depends on the dehydrogenation method from which it was produced. To date, the majority of efforts have employed metal-based catalysis. Metal-based catalysts have produced the fastest rates for a single equivalent of $H_2$ released from AB and up to 2.5 equivalents of $H_2$ can be produced within 2 hours. The predominant, and most desirable, product of hydrogen generation from ammonia borane via metal-based catalysis is polyborazylene ("PB").

The viability of any chemical hydrogen storage system is critically dependent on efficient recyclability, but reports on the latter subject are sparse, invoke the use of high energy reducing agents, and suffer from low yields. Previous methods of regeneration of AB from polyborazylene involve multiple steps and require the use of a metal-containing reducing agent and reagents such as benzenedithiol. This increases the cost of industrial-scale production, due to the relatively high molecular weight of the reagents, the cost of disposal of the reagents and byproducts, etc. A need exists, therefore, for a simpler and more effective process for regenerating ammonia borane from $H_2$-depleted AB, in particular, polyborazylene.

SUMMARY OF THE INVENTION

The present invention meets the aforementioned need by providing, for the first time, a method of ammonia borane regeneration which, in one embodiment, comprises a single step. In addition to ammonia borane, ammonia borane anions also may be produced. It has been found that hydrazine and derivatives thereof are useful for efficient regeneration of ammonia borane directly from polyborazylene. In addition to polyborazylene, ammonia borane may be regenerated from cyclopentaborazane. Hydrazine and hydrazine derivatives have a relatively low molecular weight, and thus provide a cost-effective alternative to reagents previously used. In addition, by reducing the number of steps and eliminating the need for metal-containing reducing agents, the method of the present invention further simplifies and reduces cost of large-scale production.

The following describe some non-limiting embodiments of the present invention.

According to a first embodiment of the present invention, a method of producing ammonia borane is provided, comprising providing a reagent comprising a dehydrogenated material in a suitable solvent; and combining the reagent with a reducing agent comprising hydrazine, a hydrazine derivative, or combinations thereof, in a reaction which produces a mixture comprising ammonia borane.

According to another embodiment of the present invention, a method of producing ammonia borane is provided, comprising providing a reagent comprising polyborazylene, cyclopentaborazane, spent fuel products, or combinations thereof; digesting the reagent with a thiol-containing agent to produce at least one borosulfide compound; and reacting the borosulfide compound with a reducing agent comprising hydrazine, a hydrazine derivative, or combinations thereof, to produce a mixture comprising ammonia borane.

According to yet another embodiment of the present invention, a method of producing ammonia borane is provided, comprising providing polyborazylene in a suitable solvent; and combining the polyborazylene with a reducing agent comprising hydrazine, a hydrazine derivative, or combinations thereof, in a reaction which produces ammonia borane, wherein the reaction occurs in a sealed reaction vessel at a temperature of from about 40° C. to about 60° C.

DETAILED DESCRIPTION OF THE INVENTION

Figure 1:
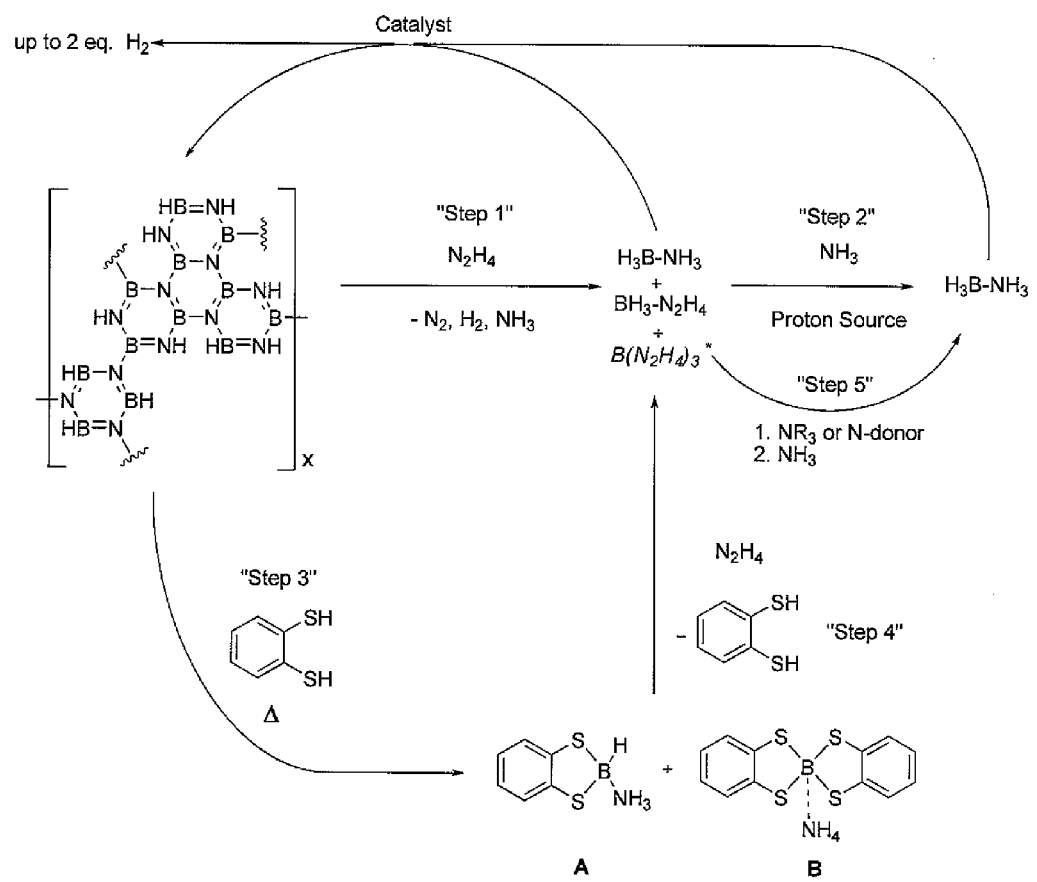
FIG. 1 is a schematic representation of the method of the present invention.

The present invention describes methods of producing ammonia borane from a dehydrogenated material, such as polyborazylene, cyclopentaborazane, and/or spent fuel products. The methods of the present invention are non-electrolytic, and may be performed under ambient temperature and pressure conditions.

The polyborazylene (PB) of the present invention has the following structure:

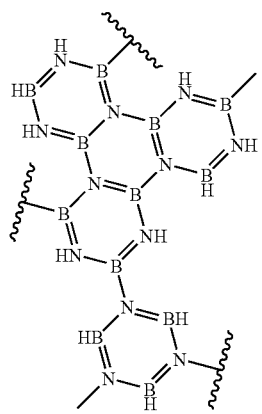

The PB may be produced, for example, by dehydrogenation of ammonia borane (AB). Dehydrogenation of AB may occur by a variety of means, one example of which is via catalysis by a base metal catalyst.

In one embodiment, the present invention describes a single-step conversion of polyborazylene to ammonia borane ($BH_3$—$NH_3$), in which the polyborazylene is allowed to react with a reducing agent comprising hydrazine, hydrazine derivatives, or combinations thereof. (FIG. 1, step 1 only). The resulting ammonia borane product is substantially free from byproducts, wherein "substantially free" is understood to mean that any byproducts are present in an amount of about 5% or less than the total of the products by weight. The single step conversion typically is performed in a sealed, pressurized vessel at an elevated temperature, for example, of from about 40° C. to about 60° C. In an alternative embodiment, the present invention describes a single-step conversion of cyclopentaborazane to ammonia borane ($BH_3$—$NH_3$), in which the polyborazylene is allowed to react with a reducing agent comprising hydrazine, hydrazine derivatives, or combinations thereof.

"Hydrazine derivatives," as used herein, is understood to include hydrazine analogs and derivatives such as anhydrous hydrazine, hydrazine mono- and di-hydrochloride, hydrazine hemisulfate, hydrazine hydrobromide, hydrazine sulfate, hydrazine hydrate, hydrazine monohydrate, hydrazine acetate, methylhydrazine, methylhydrazine hydrochloride, methylhydrazine sulfate, N,N'-dimethylhydr azine, 1,2-dimethylhydrazine, ethylhydrazine, 1,2-diethylhydrazine, 1,2-diethylhydrazine dihydrochloride, propylhydrazine, phenylhydrazine, phenylhydrazine hydrochloride, 1-methyl-1-phenylhydrazine, 1-acetyl-2-phenylhydrazine, 2-(trifluoromethyphydrazine, 3-(trifluoromethyl)hydrazine, 1,2-diphenylhydrazine, 1,1-diphenylhydrazine hydrochloride, hydrazobenzene, benzylhydrazine, benzylhydrazine dihydrochloride, cyclohexylhydrazine and cyclohexylhydrazine hydrochloride. Prior to reaction, the polyborazylene is dissolved in a suitable solvent, understood herein to mean a solvent that substantially dissolves the polyborazylene and/or the reaction products without interfering with the conversion of polyborazylene and other constituents to ammonia borane. Some examples of suitable solvents include, but are not limited to, tetrahydrofuran (THF), hydrazine, glyme, diglyme, tetraglyme, toluene, hexane, triethylamine, diethylamine, trioctylamine, liquid ammonia, diethyl ether, and combinations thereof.

In addition to polyborazylene and cyclopentaborazane, spent fuel components also may be converted to ammonia borane upon reaction with a reducing agent comprising hydrazine, hydrazine derivatives, or combinations thereof. "Spent fuel components," as used herein, is understood to include any boron and nitrogen containing molecule or oligomer, other than polyborazylene, resulting from the dehydrogenation of ammonia borane or an ammonia borane anion, and alkyl or aryl substituted aminoboranes, such as but not limited to borazine, cyclotriborazine, diborane, diammoniate of diborane, aminoborane, iminoborane, methylaminoborane, and combinations thereof. "Alkyl or aryl substituted aminoboranes," as used herein, is understood to include but is not limited to methylaminoborane, polyaminoborane, polyiminoborane, cyclopentaborazane ($B_5N_5H_{20}$), ethylaminoborane, isopropylaminoborane, butylaminoborane, dimethylaminoborane, diethylaminoborane, diisopropylaminoborane, methylethylaminoborane, phenylaminoborane, 2,6-dimethylphenylaminoborane, 2,4,6-trimethylphenylaminoborane, 2,6-diisopropylphenylaminoborane, oligomers of $BH_xNH_x$ (where x=1, 2 or 3) and combinations thereof.

The reaction may be allowed to proceed for a period of time of about 24 hours or less, alternatively for about twelve hours or less, alternatively from about 10 to about 14 hours, and alternatively for about 12 hours at standard (atmospheric) pressure.

The temperature at which the reaction is performed should be within the temperature range at which the hydrazine or derivative thereof is in a liquid state, i.e., from about −4° C. to about 96° C. Alternatively the temperature is from about 25° C. to about 60° C., and alternatively is about 25° C.

In one embodiment, the reaction may proceed in a pressurized reaction vessel under a pressure of from about 200 psi to about 400 psi.

In addition to producing ammonia borane, the reaction of polyborazylene with hydrazine may also result in formation of one or more byproducts, including $BH_3$—$N_2H_4$, and a byproduct of uncertain identity (thought to be $B(N_2H_4)_3$) (see FIG. 1, step 1). One or more of the byproducts may be converted to ammonia borane by the addition of an ammoniating agent, or ammonia-containing reagent, non-limiting examples of which are ammonia, triethylamine, diethylamine, trioctylamine, and combinations thereof. Thus, in one embodiment, the method of the present invention comprises the step of reacting a byproduct with an ammonia-containing agent to produce ammonia borane (FIG. 1, step 2). Optionally, the method may include an additional step (FIG. 1, step 5) of transformation of $BH_3$—$N_2H_4$ to $BH_3N(CH_2CH_3)_3$, $BH_3$—$NH(CH_2CH_3)_2$ and/or $BH_3$—$B((CH_2)_7CH_3)_3$ via an exchange with an appropriate amine followed by the ammoniation, thus helping to increase the ultimate yield of AB. Appropriate amines may include trimethylamine, triethylamine, diethylamine, trioctyl amine, and other suitable amines, as well as N-donors such as pyridine, 2,4-dimethylaminopyridine (DMAP), and combinations of any of the foregoing.

In another embodiment of the present invention, the polyborazylene or spent-fuel components may be digested with, for example, a thiol-containing agent to produce at least one borosulfide compound, as depicted in FIG. 1, step 3, and compounds "A" and "B." Non-limiting examples of suitable thiol-containing agents include thiophenol, benzenedithiol, toluene-3,4-dithiol, and combinations thereof. In one embodiment, the thiol is benzenedithiol. The borosulfide compound(s) may, in turn, be allowed to react with a reducing agent comprising hydrazine, hydrazine derivatives, or combinations thereof, to produce ammonia borane (FIG. 1, step 4). It is possible that during this step, one or more byproducts are produced. These byproducts may be converted to ammonia borane by reaction with an ammonia-containing agent.

In another embodiment of the present invention, the method of producing ammonia borane consists essentially of providing polyborazylene or spent-fuel components in a suitable solvent and reacting the polyborazylene with a reducing agent comprising hydrazine, a hydrazine derivative, or combinations thereof, to produce ammonia borane. The reaction may take place at a temperature of from about −4° C. to about 96° C. for a period of 24 hours or less.

EXAMPLES

Example 1

Reduction of $NH_3.HB(C_6H_4S_2)$: $NH_3.HB(C_6H_4S_2)$ (0.05 g) was dissolved in THF (0.5 mL) in an NMR tube and an excess of hydrazine monohydrate added (0.1 mL). Gas evolution was immediately observed and a light precipitate formed which reacted further to yield a clear solution. The reaction was followed by $^{11}$B NMR and after 12 hours at room temperature the major product was identified as ammonia borane as a result of the chemical shift, splitting and coupling constants (quartet, −22.3 ppm, 91 Hz). The solution was then spiked with a sample of ammonia borane and this resonance increased in intensity thus confirming the product to be ammonia borane. Two additional products were observed in small yield—$N_2H_4$—$BH_3$ as a quartet at −18.5 ppm and an, as yet, unidentified singlet at 19 ppm.

Example 2

Reduction of $[H_4][B(C_6H_4S_2)_2]$. The reaction described in Example 1 was repeated using $[NH_4][B(C_6H_4S_2)_2]$ instead of $NH_3 \cdot HB(C_6H_4S_2)$ and heated at 60° C. overnight. AB formation was observed, although the reaction did not proceed to completion.

Example 3

Reduction of Polyborazylene. Polyborazylene was dissolved in THF and anhydrous hydrazine added. Gas evolution was immediately observed and a light precipitate formed which reacted further to yield a clear solution. The reaction was followed by $^{11}$B NMR and after 12 hours at room temperature the major product was identified as hydrazine borane as a result of the chemical shift, splitting and coupling constants in addition to AB and an, as yet unidentified product with a $^{11}$B resonance at ~19 ppm. The solution was then spiked with a sample of ammonia borane and this resonance increased in intensity thus confirming the product to be ammonia borane.

The reaction was repeated with heating to 60° C. and this resulted in a cleaner reaction generating a mixture of ammonia borane and hydrazine borane with some of the 19 ppm product present.

The reaction was repeated in diglyme to give a similar distribution of products. However in toluene, in which AB is not soluble, the 19 ppm was the only species in the toluene fraction although in the $N_2H_4$ layer the major product was $N_2H_4$—$BH_3$ with some additional AB. It has further been shown that $N_2H_4$—$BH_3$ can be converted to AB with an ammonia solution and gentle heating to 60° C. overnight.

Example 4

Reduction of Cyclopentaborazane. A suspension of cyclopentaborazane in THF and subsequent addition of an excess of anhydrous hydrazine results in mild gas evolution and the formation of a colorless solution after approximately 1 hour. Analysis of the solution reveals the formation of hydrazine borane and ammonia borane in approximately 60% combined yield assessed by boron NMR. Upon heating the solution at 50° C. overnight the yield of $BH_3$ containing species (i.e. hydrazine borane and ammonia borane) increases to 80%. The solution can be taken to dryness and solids redissolved in THF to yield only $BH_3$ containing species in 90% isolated yield.

Example 5

Conversion of Hydrazine Borane to Ammonia Borane. Hydrazine borane can be dissolved in a solution of trimethylamine ($Me_3N$, 1.0 M in THF) to yield $Me_3N$—$BH_3$ in up to 80% yield at room temperature. $Me_3N$—$BH_3$ can either be heated gently (50° C., up to 36 hours) in a solution of $NH_3$ or stirred in liquid ammonia for several days to yield ammonia borane. Alternatively, hydrazine borane can be dissolved in THF and a slight excess of DMAP (4-dimethylaminopyridine) can be added to result in quantitative conversion to DMAP—$BH_3$. Similarly, this can be heated gently (50° C., up to 36 hours) in a solution of $NH_3$ or stirred in liquid ammonia for several days to yield ammonia borane. Alternatively, hydrazine borane 13 mg was suspended in liquid ammonia (30 mL) at −77° C. in a stainless steel reaction vessel with and internal volume of 75 mL. The reaction vessel was sealed and heated to 60° C., resulting in a pressure of approximately 400 psi. After 48 hours the reaction was cooled to −77° C. and the vessel was opened. The ammonia solution was poured into an open beaker and the ammonia was allowed to evaporate yielding the ammonia borane. After removal of excess ammonia, hydrazine borane is converted to ammonia borane in 95% yield by $^{11}$B NMR.

Example 6

Direct conversion of polyborazylene to ammonia borane. Polyborazine 100 mg was suspended in liquid ammonia (30 mL) at −77° C. in a stainless steel reaction vessel with and internal volume of 75 mL. Hydrazine (100 mg) was added using a syringe. The reaction vessel was sealed and heated to 40° C., resulting in a pressure of approximately 220 psi. After 24 hours the reaction was cooled to −77° C. and the vessel was opened. The ammonia solution was poured into an open beaker and the ammonia was allowed to evaporate yielding the ammonia borane in 95% yield with the remaining 5% being hydrazine borane based on $^{11}$B NMR. No other species are present.

In all embodiments of the present invention, all percentages are by weight of the total composition, unless specifically stated otherwise. All ratios are weight ratios, unless specifically stated otherwise. All ranges are inclusive and combinable. All numerical amounts are understood to be modified by the word "about" unless otherwise specifically indicated. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of producing ammonia borane, comprising:
   a) providing a reagent comprising a dehydrogenated material in a suitable solvent; and
   b) combining the reagent with a reducing agent comprising hydrazine, a hydrazine derivative, or combinations thereof, in a reaction which produces a mixture comprising ammonia borane.

2. The method of claim 1, wherein the dehydrogenated material comprises polyborazylene, cyclopentaborazane, spent fuel products, or combinations thereof.

3. The method of claim 1, wherein the reducing agent comprises tetrahydrofuran, hydrazine, glyme, diglyme, tetraglyme, toluene, hexane, triethylamine, diethylamine, trioctylamine, liquid ammonia, diethyl ether, or combinations thereof.

4. The method of claim 1, wherein the reaction proceeds for a period of time of 24 hours or less.

5. The method of claim 1, wherein the reaction proceeds at a temperature of from about −4° C. to about 96° C.

6. The method of claim 4, wherein the temperature is about 25° C.

7. The method of claim 1, wherein the reaction proceeds at a temperature of from about 40° C. to about 60° C. and at a pressure of from about 200 psi to about 400 psi.

8. The method of claim 7, wherein the ammonia borane is substantially free from byproducts.

9. The method of claim 1, wherein the mixture comprises produces a byproduct.

10. The method of claim 9, further comprising the step of reacting the byproduct with an ammonia-containing reagent to produce ammonia borane.

11. The method of claim 10, wherein the ammonia-containing reagent is ammonia, triethylamine, diethylamine, trioctylamine, and combinations thereof.

12. The method of claim 1, wherein the spent fuel components comprise alkyl substituted aminoboranes, aryl substituted aminoboranes, borazine, cyclotriborazine, diborane, diammoniate of diborane, aminoborane, iminoborane, methylaminoborane, or combinations thereof.

13. A method of producing ammonia borane, comprising:
    a) providing a reagent comprising polyborazylene, cyclopentaborazane, spent fuel products, or combinations thereof;
    b) digesting the reagent with a thiol-containing agent to produce at least one borosulfide compound; and
    c) reacting the borosulfide compound with a reducing agent comprising hydrazine, a hydrazine derivative, or combinations thereof, to produce a mixture comprising ammonia borane.

14. The method of claim 13, wherein the thiol-containing agent is an aromatic dithiol.

15. The method of claim 14, wherein the aromatic dithiol comprises benzenedithiol, toluene-3,4-dithiol, or combinations thereof.

16. The method of claim 13, wherein the reaction proceeds for a period of time of 24 hours or less.

17. A method of producing ammonia borane, comprising:
    a) providing polyborazylene in a suitable solvent; and
    b) combining the polyborazylene with a reducing agent comprising hydrazine, a hydrazine derivative, or combinations thereof, in a reaction which produces ammonia borane,
    wherein the reaction occurs in a sealed reaction vessel at a temperature of from about 40° C. to about 60° C.

18. The method of claim 17, wherein the solvent comprises tetrahydrofuran, hydrazine, glyme, diglyme, tetraglyme, toluene, hexane, triethylamine, diethylamine, trioctylamine, liquid ammonia, diethyl ether, and combinations thereof.

19. The method of claim 18, wherein the solvent is liquid ammonia.

20. The method of claim 17, wherein the ammonia borane is substantially free from byproducts.

* * * * *